US010713316B2

(12) United States Patent
Guo et al.

(10) Patent No.: US 10,713,316 B2
(45) Date of Patent: Jul. 14, 2020

(54) SEARCH ENGINE USING NAME CLUSTERING

(71) Applicant: Microsoft Technology Licensing, LLC, Redmond, WA (US)

(72) Inventors: Lin Guo, Sunnyvale, CA (US); Abhimanyu Lad, San Mateo, CA (US); Ganesh Venkataraman, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 860 days.

(21) Appl. No.: 15/299,100

(22) Filed: Oct. 20, 2016

(65) Prior Publication Data

US 2018/0113943 A1    Apr. 26, 2018

(51) Int. Cl.
*G06F 16/9535*    (2019.01)
*G06F 16/9038*    (2019.01)
*G06F 16/9032*    (2019.01)
*G06F 16/35*    (2019.01)
*G06F 40/242*    (2020.01)
*G06F 40/279*    (2020.01)

(52) U.S. Cl.
CPC .......... *G06F 16/9535* (2019.01); *G06F 16/35* (2019.01); *G06F 16/9038* (2019.01); *G06F 16/90332* (2019.01); *G06F 40/242* (2020.01); *G06F 40/279* (2020.01)

(58) Field of Classification Search
CPC ............. G06F 16/9535; G06F 16/9038; G06F 16/90332; G06F 17/2735; G06F 17/2765; G06F 16/35
See application file for complete search history.

(56) References Cited

U.S. PATENT DOCUMENTS

| 9,002,866 | B1 | 4/2015 | Brunsman et al. |
| 2005/0084152 | A1 | 4/2005 | Mcpeake et al. |
| 2016/0012020 | A1* | 1/2016 | George ............... G06F 17/2785 704/9 |
| 2016/0283574 | A1 | 9/2016 | Anderson et al. |

OTHER PUBLICATIONS

"International Application Serial No. PCT/US2017/054077, International Search Report dated Dec. 15, 2017", 2 pgs.
"International Application Serial No. PCT/US2017/054077, Written Opinion dated Dec. 15, 2017", 4 pgs.

* cited by examiner

*Primary Examiner* — Jay A Morrison
(74) *Attorney, Agent, or Firm* — Schwegman Lundberg & Woessner, P.A.

(57) ABSTRACT

This disclosure relates to systems and methods for searching names using name clusters. A method includes receiving names, generating a plurality of phonetic cluster identifiers, forming a plurality of name clusters by grouping the names having an equivalent cluster id, removing names from the respective name clusters that differ from a root name by more than either a particular spelling of a phonetic sound or a specific member's reformulation according to a reformulation dictionary, and suggesting one or more names by generating a phonetic cluster id for the received name using the database of phonetic associations and returning names found in the name cluster that matches the phonetic cluster id.

20 Claims, 9 Drawing Sheets

*400*

| UNIQUE NAME | CLUSTER ID |
|---|---|
| DAVID | DVD |
| DAVIDA | DVD |
| DAVITA | DVT |
| DAVEY | DV |
| DAVE | DV |
| DAVIS | DVS |

*FIG. 4*

SEARCH ENGINE USING NAME CLUSTERING

TECHNICAL FIELD

The subject matter disclosed herein generally relates to correcting input names and, more particularly, to a search engine for names using name clustering.

BACKGROUND

People across the world have a wide variety of names in different languages that are often spelled in unique ways. Hearing a name in a certain language may not give sufficient insight to spell the name due to inexperience with the language of origin for the name. In one scenario, a person hears another person's name (e.g., during verbal introductions) and wants to search for that person, but does not know how to spell the name of the person.

BRIEF DESCRIPTION OF THE DRAWINGS

Some embodiments are illustrated by way of example and not limitation in the figures of the accompanying drawings.

FIG. 4 is a table illustrating phonetic cluster identifiers (ids), according to one example embodiment.

DETAILED DESCRIPTION

Figure 1:
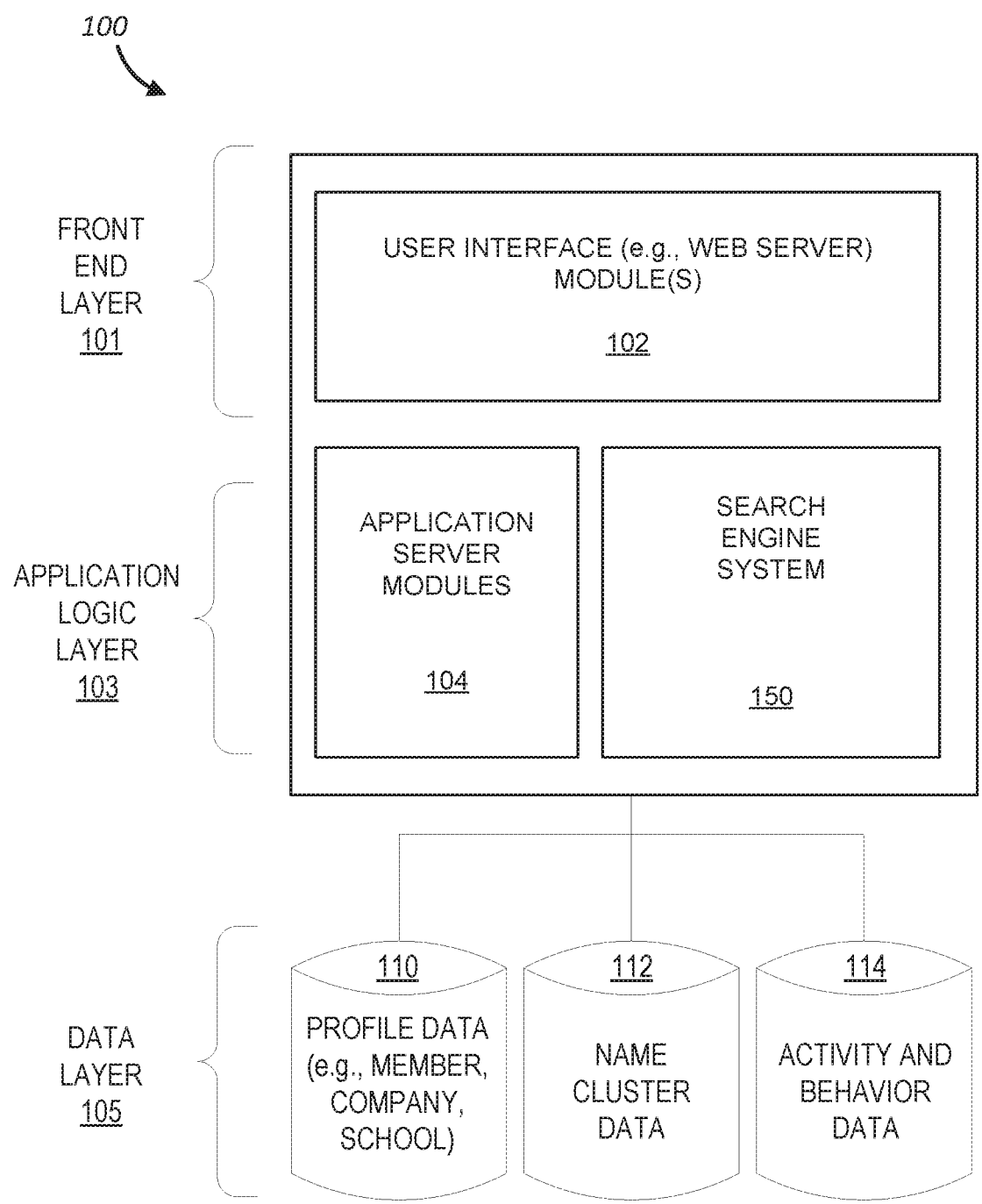
FIG. 1 is a block diagram illustrating various components or functional modules of an online social networking service, in an example embodiment.

The description that follows includes systems, methods, techniques, instruction sequences, and computing machine program products that embody the inventive subject matter. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an embodiment, a social networking and/or business networking system includes a search engine that includes a name clustering function. Such a name clustering function first involves a rough clustering, which can also be referred to as a level 1 clustering. The level 1 clustering creates a rough cluster id for each name in a population (e.g., each member in a social networking system). It is referred to as a rough cluster id because the cluster id is too coarse. That is, there are too many false positives. The rough clustering is based on a normalization of members' names in the population.

In one example embodiment, level 1 clustering includes "Jeff" and "Joff" in the same name cluster because when vowels are removed, the resulting phonetic identifiers are the same. However, a person hearing "Jeff" would not typically believe the name to have been "Joff." Therefore, such differences will need to be removed from the name clusters. Many examples of how this is done are included herein. In other examples of names that should not be in the same name cluster but will likely be included in the same name cluster in level 1 are Python and Peyton, Nihat and Nihit, Shutter and Suiter, Shutter and Sauter, Foreman and Freeman. Joann and Jan, Jacek and Jack. This is the case because a person hearing "Shutter" does not typically believe the heard name to have been "Sauter" because the vowel sounds are sufficiently different.

In one example embodiment, level 1 normalization includes the removal of vowels and repeated characters (consonants) from the member names. The system takes each cluster that was generated in the rough clustering function and breaks up each cluster into final name clusters. The name clusters are generated by comparing all names in a cluster against each other and determining the similarity among the names in the cluster. When these comparisons are positive (i.e., the comparison indicates that a name in the cluster is similar to all other names in the cluster), the names are kept together in the final name cluster by performing a transitive closure.

In another example embodiment, level 1 normalization includes reducing consonant sounds to a default phonetic representation. For example, all "ph" sounds in a name are reduced to an "f," or all "c" sounds are reduced to either an "s" (e.g. Cecil) or a "k" (e.g., Carl) depending on the name. In this way, each name is represented using a standard phonetic representation.

In one example embodiment, the name clusters are then filtered according to a set of rules. For example, a first rule is that a name is kept in a certain cluster if a difference between the name and a root name for the cluster is limited to a single phonetic sound. In one example, a root node for a cluster is "JFF" and a node name in the cluster is "GFF" (e.g., for the name "Geff"). In this example, because "GFF" differs from "JFF" in only one phonetic sound ("G" vs. "J") it is kept in the cluster. In another example embodiment, a filter rule for a cluster includes keeping a name in a certain cluster if a difference between the root name for the cluster and the name is a specific member's reformulation according to a reformulation dictionary. After applying a set of rules to the formed name clusters, the resulting clusters demonstrate increased performance recommending name spellings in response to receiving a name from a user of an online social networking service.

FIG. 1 is a block diagram illustrating various components or functional modules of an online social networking service 100, in an example embodiment. In one example, the online social networking service 100 includes a search engine system 150 that performs many of the operations described herein.

A front end layer 101 consists of one or more user interface modules (e.g., a web server) 102, which receive requests from various client computing devices and communicate appropriate responses to the requesting client devices. For example, the user interface module(s) 102 may receive requests in the form of Hypertext Transfer Protocol (HTTP) requests, or other web-based application programming interface (API) requests. In another example, the front end layer 101 receives requests from an application executing via a member's mobile computing device.

An application logic layer 103 includes various application server modules 104, which, in conjunction with the user interface module(s) 102, may generate various user interfaces (e.g., web pages, applications, etc.) with data retrieved from various data sources in a data layer 105. In one example embodiment, the application logic layer 103 includes the search engine system 150 that is configured to perform the cluster formulation and name recommendation operations described herein.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations, name cluster data, member interactions, member queries, or the like. In certain examples, the database 112 includes name cluster data including specific clusters for phonetically spelled names as will be further described. In another example embodiment, the database 114 stores member activity and behavior data used to generate name clusters, phonetic associations, member name reformulations, or the like.

Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the online social networking service 100, the representative may be prompted to provide certain information about the organization. This information may be stored, for example, in the database 110, or another database (not shown).

The online social networking service 100 may provide a broad range of other applications and services that allow members the opportunity to share and receive information, which is often customized to the interests of the member. For example, in some examples, the online social networking service 100 may include a message sharing application that allows members to upload and share messages with other members. In some examples, members may be able to self-organize into groups, or interest groups, organized around subject matter or a topic of interest. In some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interactions may be stored, for example, as indicated in FIG. 1 by the database 114. In one example embodiment, the interactions are in response to receiving a message requesting the interactions.

In certain example embodiments, member interactions include members searching for other members by typing in the names of the other members. As members correct names until they find the other members they are looking for, the search engine system 150 stores their reformulations. In one example, a member initially searches for "Shree," but then changes their search to "Shri." In response, the search engine system 150 stores a phonetic association between "ee" and "i" in the database 114.

Although not shown, in some examples, the online social networking service 100 provides an API module via which third-party applications can access various services and data provided by the online social networking service 100. For example, using an API, a third-party application may provide a user interface and logic that enables the member to submit and/or configure a set of rules used by search engine system 150. Such third-party applications may be browser-based applications or may be operating system specific. In particular, some third-party applications may reside and execute on one or more mobile devices (e.g., phones or tablet computing devices) having a mobile operating system.

The ability to generate cluster identifiers based on names in the social networking service 100, by grouping names having an equivalent cluster id, and finalizing clusters wherein each name in the cluster is similar to each other name in the cluster, can be achieved with a general processing engine. The general processing engine may execute in real-time or as a background operation, such as offline or as part of a batch process. In some examples that incorporate relatively large amounts of data to be processed, the general processing engine may execute via a parallel or distributed computing platform.

In one example embodiment, a plurality of names is received into a social and/or business networking system. This receiving of names can be in association with registering users or members of the social networking service. The search engine system removes one or more vowels from each of the plurality of names. The search engine system 150 may also reduce each name according to a standard phonetic representation as described herein.

The removal of vowels from the names generates what can be referred to as cluster identifiers. For example, the names David, Davida, Davita, Davey, Dave, and Davis generate the cluster identifiers dvd, dvd, dvt, dvy, dv, and dvs respectively. In an embodiment, double consonants are identified and one of the consonants is removed from the names before generating the plurality of cluster identifiers. For example, with the name "Matthew," the cluster id of mthw would be formed (that is, removing one of the double "t's").

As previously described, the search engine system 150, in one example embodiment, treats two different letters as equivalent when forming the plurality of cluster identifiers. For example, the letters "c" and "k" may be treated as equivalent, so that the cluster identifiers for the names Cathy and Kathy, that is, cth and kth, are put into the same cluster. Then, as is explained below, a user searching for a Cathy in the social networking system will also automatically locate members with the name of Kathy.

A plurality of first clusters is formed by grouping together names having an equivalent cluster id. In an embodiment, the system is configured to group together names that have an identical cluster id. Using the same example, an identical cluster id could be "dvd", and all names that reduce to a cluster id of "dvd" would be placed into the same cluster (at least initially and prior to formation of a final cluster). The search engine system filters the respective clusters according to a number of rules that will be further described.

Accordingly, the search engine system 150 exhibits increased accuracy in name spelling recommendations. Systems using previous methods would recommend "Joff" in place of "Jeff," "Python" in place of "Peyton," "Nihat" in place of "Nihit," "Shutter" in place of "Suiter," and other inappropriate name recommendations because of character differences being below a threshold number. Furthermore, the search engine system 150 may recommend "Jessika" in place of "Jessica," "Eric" to replace "Erik," and "Catherine" for "Katherine." Therefore, the search engine system provides benefits and advantages not demonstrated in previous systems.

In one example embodiment, a member physically meets another member at a social event and remembers that the person's name was "Chris," or "Kris" but is not sure how it was spelled because the member only heard the name. In this example embodiment, in response to the searched member having a name of "Kris," and the member searching for "Chris," the search engine system 150 correctly recommends "Kris" In response to no name "Chris" being found in the cluster of names. This may be especially interesting in a situation where the searched member's name includes a unique spelling or atypical pronunciation (e.g., "Shaniqua," "Mo'Nique," or similar).

Figure 2:
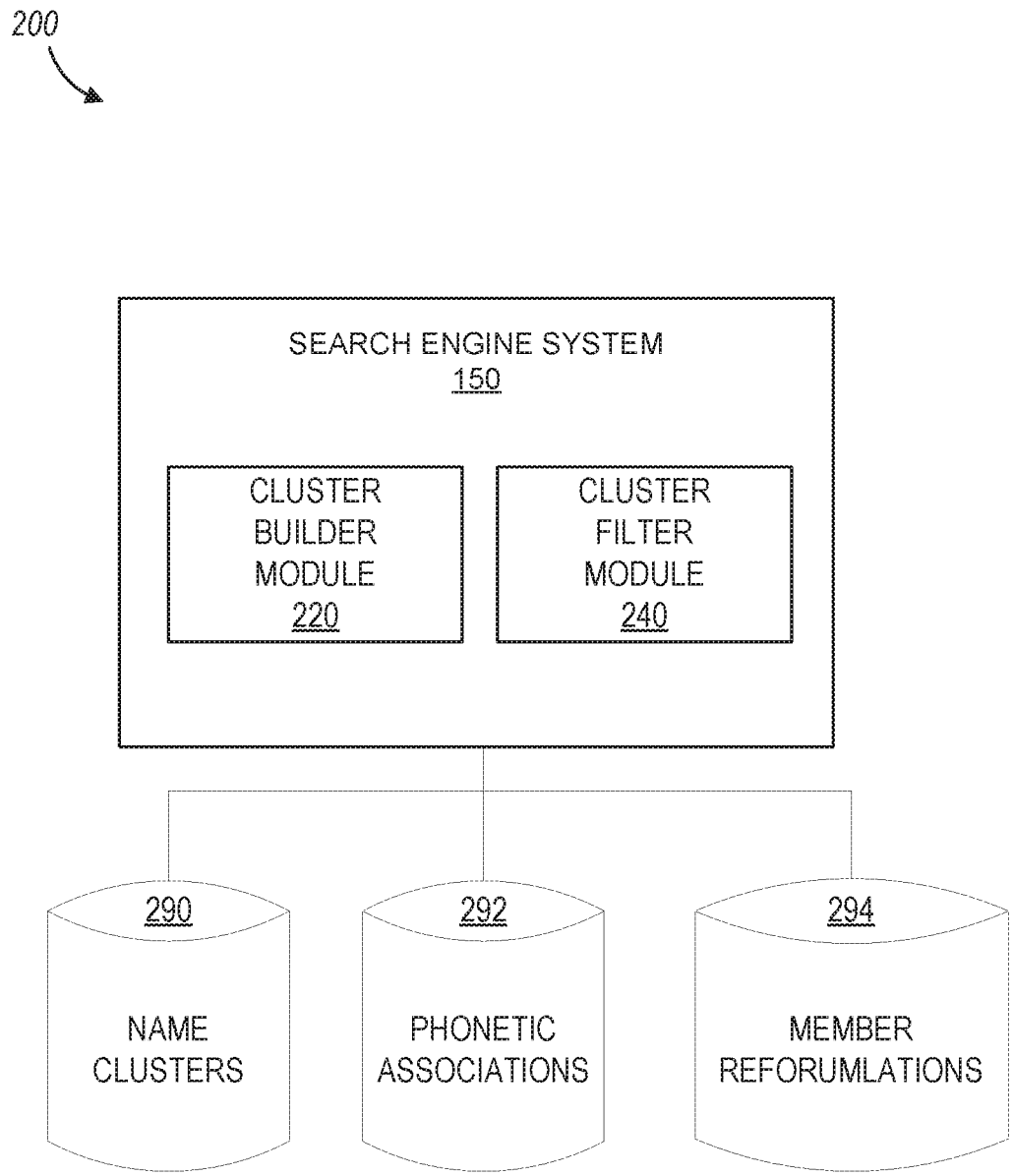
FIG. 2 is a block diagram illustrating a system for searching names using name clusters, according to one example embodiment.

FIG. 2 is a block diagram illustrating a system 200 for searching names using name clusters, according to one example embodiment. In this example embodiment, the search engine system 150 includes a cluster builder module 220 and a cluster filter module 240. The search engine system 150 may also be connected to a name cluster database 290, a phonetic associations database 292, or a member name reformulations database 294.

In certain example embodiments, the name clusters are stored in the name cluster database 290, the dictionary of phonetic associations is stored in a phonetic associations database 292, and the member reformulation dictionary is stored in the member name reformulations 294. Any one or more of the databases 290, 292, 294 may be remote electronic databases providing a network based digital interface for retrieving and storing data records.

In one example embodiment, the cluster builder module 220 is configured to receive a plurality of names. In one example, the names are retrieved from a server of names such as, but not limited, an online corporate directory, a social network, or the online social networking service, or retrieved from a remote database using an electronic network interface.

In another example embodiment, the cluster builder module 220 generates a plurality of phonetic identifiers according to a phonetic spelling of the names using a database of phonetic associations and not including vowel sounds. In particular, to generate the phonetic identifier, the cluster builder module 220 replaces one or more identified letters (or groupings of letters) in a particular name with phonetic equivalents. For example, the cluster builder module 220 may reduce all "ph" spellings to "f" sounds, all "ee" spellings to "i" spellings, all "c" and "ck" spellings to "k" spellings, or the like. The cluster builder module 220 then forms a plurality of name clusters by grouping the names having an equivalent cluster identifier, as previously described.

The cluster builder module 220 then removes names from the respective name cluster according to one or more filtering rules. In one example, a filter rule includes removing names that differ from a root name by more than a particular spelling of a phonetic sound. In general, a "root name" is a name first added to a name cluster or is associated with the root node of a name duster. In one example, "Jeff" and "Joff" are in the same name cluster because they have an equivalent id (vowels and double letters removed) of "JF." However, because there are not any phonetic sounds that account for the "e" and "o," "Jeff" and "Joff" differ by more than a particular spelling on a phonetic sound and one or the other is moved to its own name cluster. In one example, "Jeff" is the root name for the cluster, and "Joff" is removed from the "Jeff" name cluster.

In another example, a filter rule includes removing names that differ from a root name by more than a specific member's reformulation. In one example, a root name for a name cluster may be "Joann" and another name in the same name cluster is "Jan" because "Joann" and "Jan" have an equivalent identifier, in this case, "JN". In this example, the cluster filter module 240 removes "Jan" from the "Joann" cluster because there is no member reformulation of input that associates "Joann" and "Jan." In one example, no member of the online social networking service had entered "Jan" and then later searched for "Joann" in the same session.

In another example embodiment, the cluster filter module 240 removes member formulations in the reformulation dictionary according to one or more rules. In one example embodiment, a member reformulation filter rule includes reformulations that occurred above a threshold percentage of the time. In one example, members correct "Mik" to "Mike" more than 80% of the time. In this example, because of the reformulation percentage being above 70%, the cluster filter module 240 removes the reformulation ("Mik" to "Mike") from the member reformulation dictionary. Because a higher percentage of member reformulations (e.g., more than 70%) typically indicate spelling errors on behalf of the members, those reformulations are not included in the name clusters. Of course, other threshold values may be used and this disclosure is not limited in this regard.

In one example embodiment, a member reformulation filter rule includes reformulations that occurred below a threshold percentage of the time. In one example, a member's reformulation includes changing "John" to "Jonh" less than 10% of the time. Because this reformulation happens rarely (e.g., less than 15% of the time), the reformulation does not likely represent an actual member (e.g., it is not likely that the reformulation "Jonh" is a real name). Of course, other threshold values may be used and this disclosure is not limited in this regard.

In another example embodiment, the cluster filter module 240 removes names that are longer than a threshold number of characters and that are a relative character edit distance from the root name for the associated cluster. In one example, the threshold number of characters is seven, and the relative character edit distance is 20% of the number of characters in the name. In one example, a name that has seven characters and a character edit distance of two or more is removed from the cluster. In another example, a name that has 20 characters and a character edit distance of five or more is removed from the cluster. Of course, other threshold numbers of characters and relative edit distances may be used and this disclosure is not limited in this regard.

In one example embodiment, the name clusters are partitioned according to a source language for the names in the name clusters. For example, the search engine system may retrieve a language for a member searching for names and limit searching to name clusters that are based on that language. In one example, "Hans" from a base English language is pronounced differently than "Hans" from a base German language. Accordingly, the cluster builder module generates a "Hans" English cluster and a "Hans" German cluster.

Figure 6:
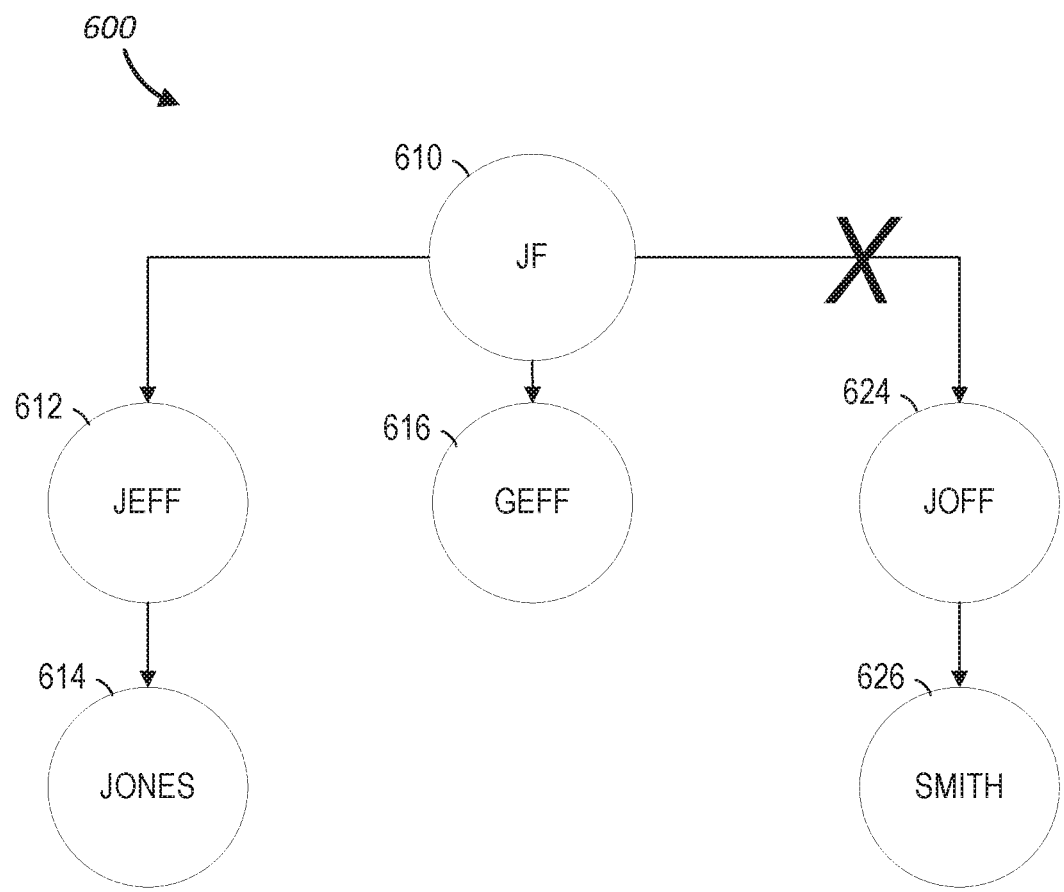
FIG. 6 is an illustration depicting another example embodiment of a name cluster.

In another example embodiment, the cluster builder module 220 generates a cluster including multiple terms in a name. In one example, a name is "De Graff" In this example, the cluster builder module 220 stores "De Graff" in a name cluster for "De" and includes "Graff" in a child node of the "De" in the "De" name cluster. Certain examples of this are depicted in FIG. 6.

Figure 3:
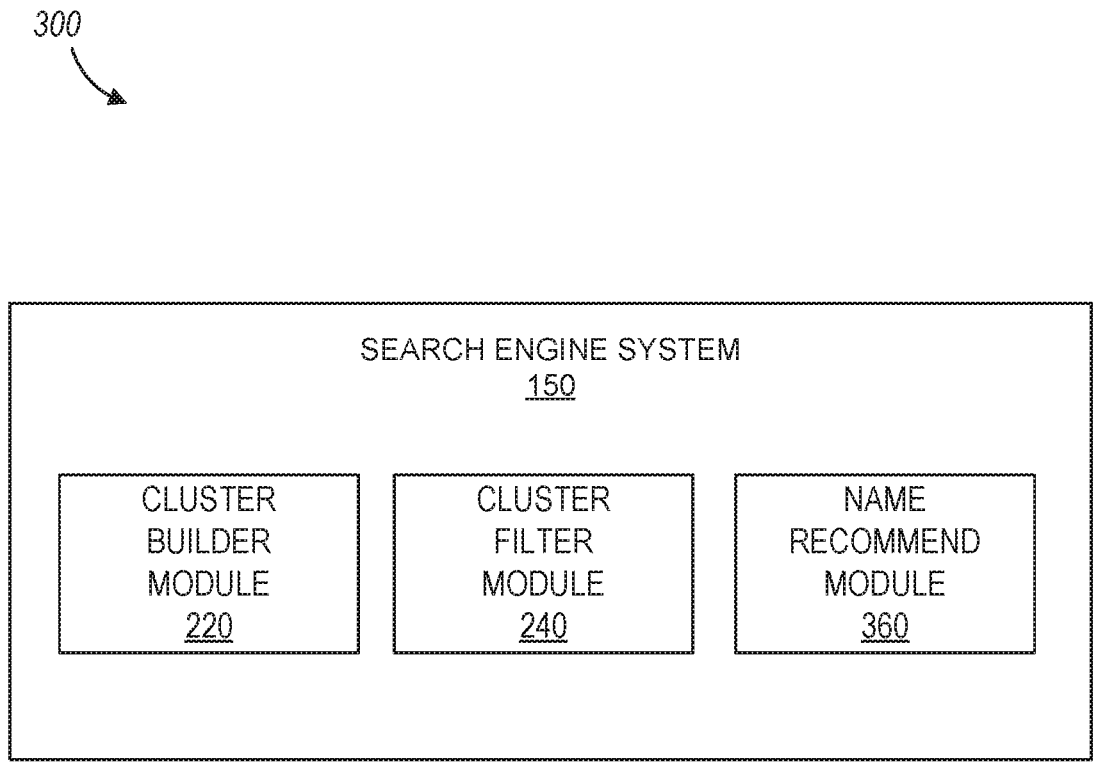
FIG. 3 is a block diagram illustrating another system for searching names using name clusters, according to one example embodiment.

FIG. 3 is a block diagram illustrating another system 300 for searching names using name clusters, according to one example embodiment. In this example embodiment, the search engine system 150 includes the cluster builder module 220, the cluster filter module 240, and a name recommend module 360. The cluster builder module 220 and the cluster filter module 240 may or may not be substantially similar to those depicted in FIG. 2.

In one example embodiment, the name recommend module 360 is configured to suggest one or more names by generating a phonetic cluster identifier for a received name and returning names found in the name cluster that match the phonetic cluster identifier. In one example, the name recommend module 360 receives "Catherine," and recommends "Katherine" because "Katherine" is found in the clusters whereas "Catherine" is not, although "Catherine" is a known name.

FIG. 4 is a table 400 illustrating phonetic cluster identifiers, according to one example embodiment. For example, the names David, Davida, Davita, Davey, Dave, and Davis generate the cluster identifiers dvd, dvd, dvt, dvy, dv, and dvs respectively. In an embodiment, double consonants are identified and one of the consonants is removed from the names before generating the plurality of cluster identifiers.

Figure 5:
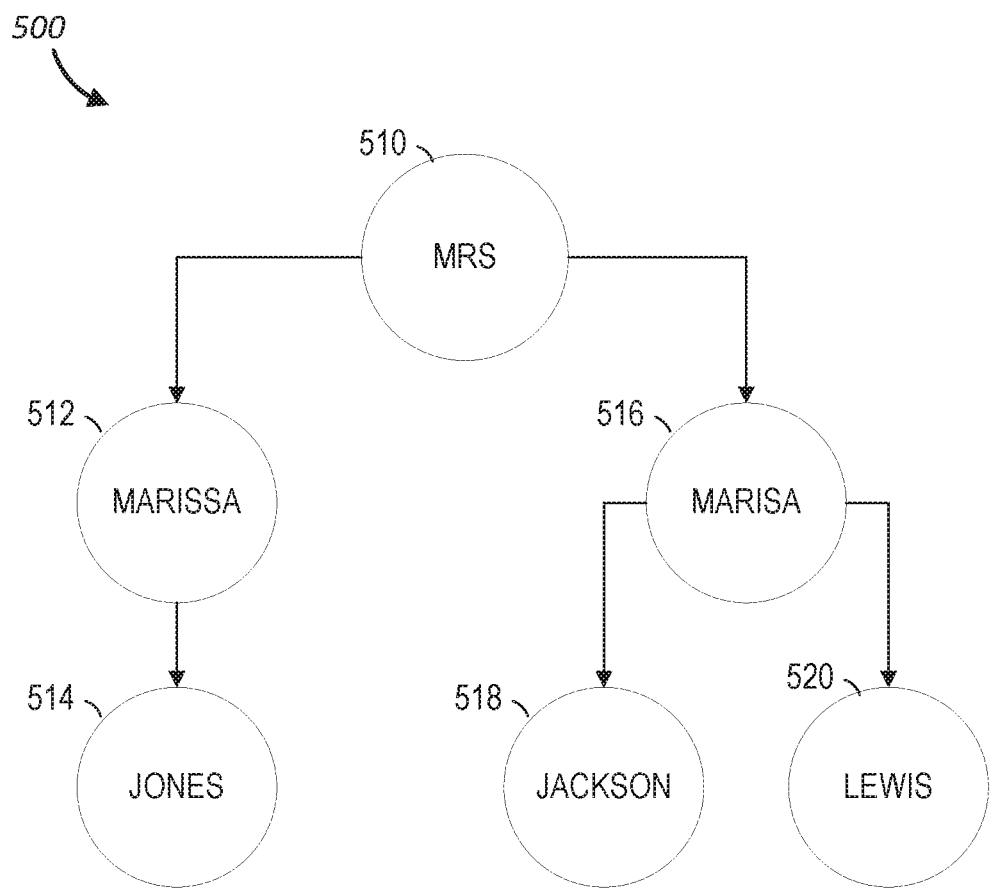
FIG. 5 is an illustration depicting one example embodiment of a name cluster.

FIG. 5 is an illustration 500 depicting one example embodiment of a name cluster. In this example embodiment, the name cluster stores names with a cluster id of "MRS." In this example, "MRS" is stored as a root node 510 and names in the name cluster are stored as child nodes 512, 516 of the root node. Furthermore, additional terms are stored as additional child nodes.

In one example, one name includes "Marissa Jones" and because "Marissa" matches the phonetic id of "MRS," "Marissa" is stored in the name cluster of child node 512 linked to the root node 510, and "Jones" is stored in a child node 514 of the "Marissa" node 512. Also, two other names, "Marisa Jackson" and "Marisa Lewis," may be stored in the same cluster by storing "Marisa" in a node 516 separate from "Marissa" and the two separate last names ("Jackson" and "Lewis") are stored as child nodes 518, 520 to the "Marisa" node 516, FIG. 6 is an illustration 600 depicting another example embodiment of a name cluster. In this example embodiment, the name cluster is for names having a cluster id of "JF." The cluster builder module 220 stores "Jeff Jones" (nodes 612 and 614), "Geff" (node 616), and "Joff Smith" (nodes 624 and 626) in the name cluster because each of these names has the same cluster id of "JF." As previously described, additional terms in a name (e.g., last names) are stored as child nodes 614, 626 although this is not necessarily the case.

In one example embodiment, the cluster filter module 240 removes the "Joff" node 624 from the name cluster because there are no phonetic sounds that account for the "e" and "o," and "Jeff" and "Joff" differ by more than a particular spelling on a phonetic sound. In one example, the "Joff" node 624 is moved to its own name cluster so that members searching for "Jeff" do not receive "Joff" as a recommendation, and members searching for "Joff" do not receive "Jeff" as a recommendation. In one example embodiment, and as depicted in FIG. 6, the name cluster includes a root name 610 with other linked according to a tree structure as one skilled in the art may appreciate.

Figure 7:
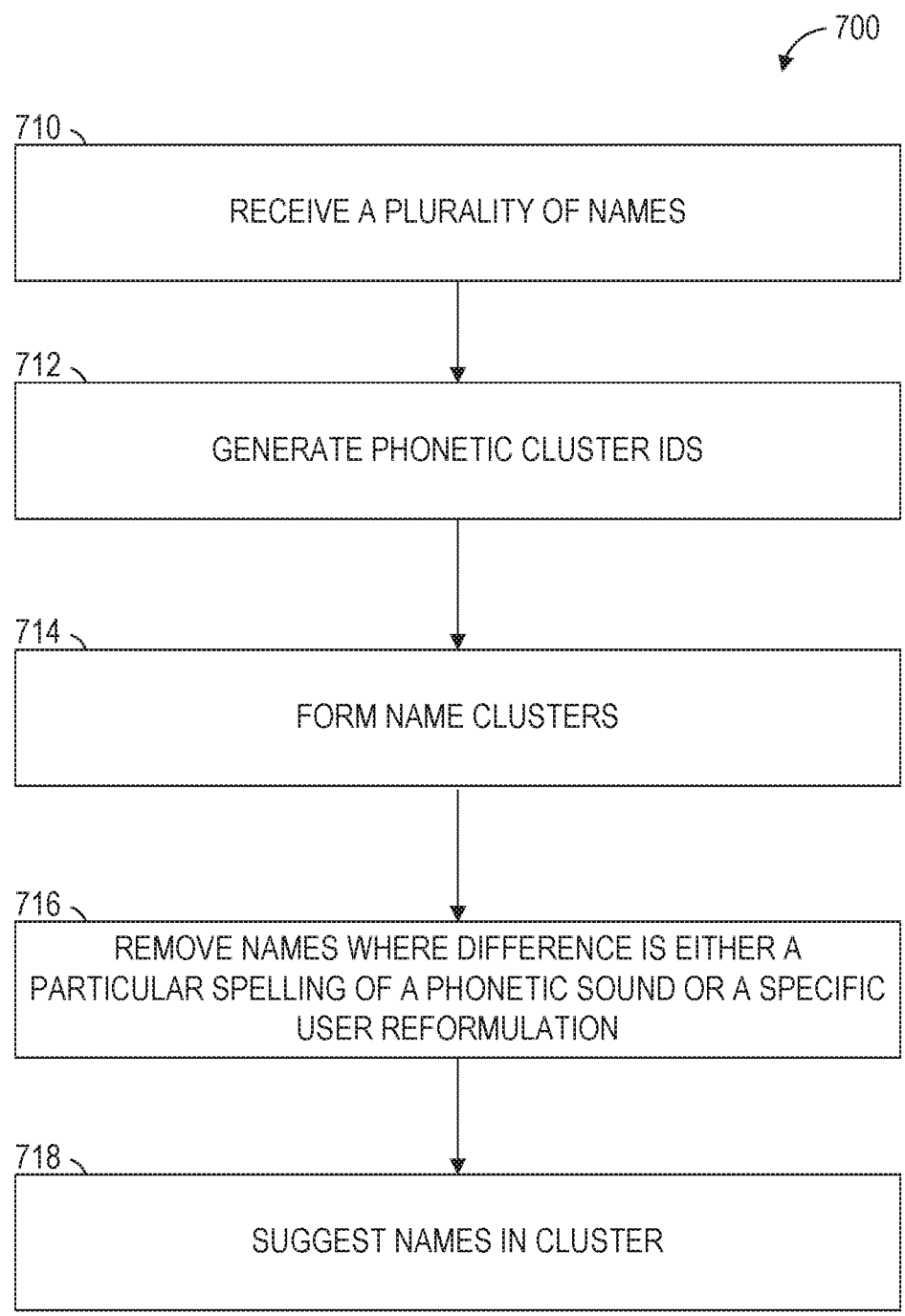
FIG. 7 is a flow chart diagram illustrating one method of sears names using name clusters, according to one example embodiment.

FIG. 7 is a flow chart diagram illustrating one method 700 of searching names using name clusters, according to one example embodiment. Operations in the method may be performed by modules described in FIGS. 2-3 and are described by reference thereto.

In one example embodiment, the method 700 begins and at operation 710 the cluster builder module 220 receives a plurality of names. In one example, the cluster builder module electronically retrieves the names from a remote database using an API.

The method 700 continues at operation 712 and the cluster builder module 220 generates a plurality of phonetic cluster identifiers according to a phonetic spelling of the names using a database of phonetic associations and not including vowel sounds. The method 700 continues at operation 714 and the cluster builder module 220 forms a plurality of name clusters by grouping the names having an equivalent cluster id. Examples of name clusters are depicted in FIGS. 5-6.

The method 700 continues at operation 716 and the cluster filter module 240 removes names from the respective name clusters that differ from a root name by more than either a particular spelling of a phonetic sound or a specific member's reformulation according to a reformulation dictionary. In one example embodiment, the cluster filter module 240 flags nodes in the name clusters that differ only by a particular spelling of a phonetic sound or a specific member's reformulation and removes other nodes in the name clusters.

The method 700 continues at operation 718 and the name recommend module 360 receives a name from a member of the online social networking service and suggests one or more names by generating a phonetic cluster id for the received name and returning names found in the name cluster that match the phonetic cluster id.

Figure 8:
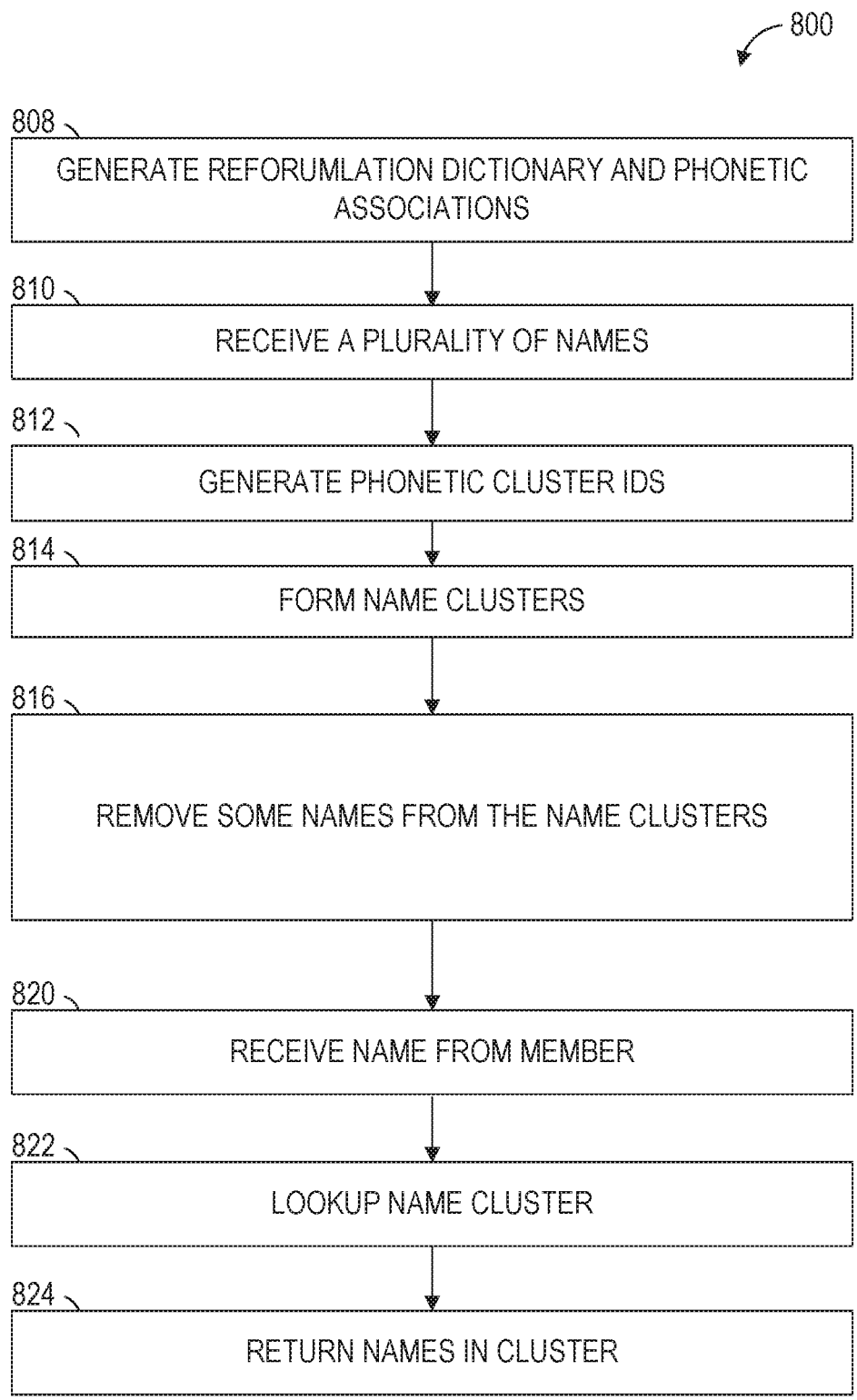
FIG. 8 is a flow chart diagram illustrating one method of searching names using name clusters, according to one example embodiment.

FIG. 8 is a flow chart diagram illustrating one method 800 of searching names using name clusters, according to one example embodiment. Operations in the method may be performed by modules described in FIGS. 2-3 and are described by reference thereto.

In one example embodiment, the method 800 begins and at operation 808, the cluster builder module 220 generates a member reformulation dictionary by tracking and storing member query reformulations. In one example, as members search for "Sreet," and subsequently search for "Srit," the cluster builder module 220 stores the reformulation of "Sreet" to "Srit" in the reformulation dictionary.

Similarly, at operation 808, the cluster builder module 220 constructs a database of phonetic associations using members' input to the online social networking service 100. In one example, members frequently replace "ee" with "i" in their queries (e.g., "Street" to "Strit," or "Roheet" to "Rohit," etc.), or replace "ph" with "f" in their queries. In response to a threshold number of users modifying their queries, the cluster builder module 220 stores the changes as phonetic associations.

The method 800 continues and at operation 810, the cluster builder module 220 retrieves a plurality of names by reading the names from an electronic input file retrieved from an electronic storage medium. Of course, the file may be formatted in any way and this disclosure is not limited regarding the format of the file.

The method 800 continues and at operation 812, the cluster builder module 220 generates a plurality of phonetic cluster identifiers according to a phonetic spelling of the names using the database of phonetic associations and not including vowel sounds. The method 800 continues at operation 814 and the cluster builder module 220 forms a plurality of name clusters by grouping the names having an equivalent cluster id. Examples of name clusters are depicted in FIG. 5-6.

The method 800 continues at operation 816 and the cluster filter module 240 removes some names from the respective name clusters. In one example, the cluster filter module 240 removes names that differ from a root name by more than either a particular spelling of a phonetic sound or a specific member's reformulation according to a reformulation dictionary. In one example embodiment, the cluster filter module 240 flags nodes in the name clusters that differ only by a particular spelling of a phonetic sound or a specific member's reformulation and removes other nodes in the name clusters. In another example embodiment, the cluster filter modules removes names that exceed a threshold number of characters and are more than a threshold ratio of characters different from a root name in the name cluster.

The method 800 continues at operation 820 and the name recommend module 360 receives a name from a member of the online social networking service. The method 800 continues and at operation 822, the name recommend module 360 looks up the associated name cluster based on the phonetic id for the received name. The method 800 continues at operation 824 and the name recommend module 360 returns the names found in the name cluster that matches the phonetic cluster id.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

EXAMPLE MACHINE ARCHITECTURE AND MACHINE-READABLE MEDIUM

Figure 9:
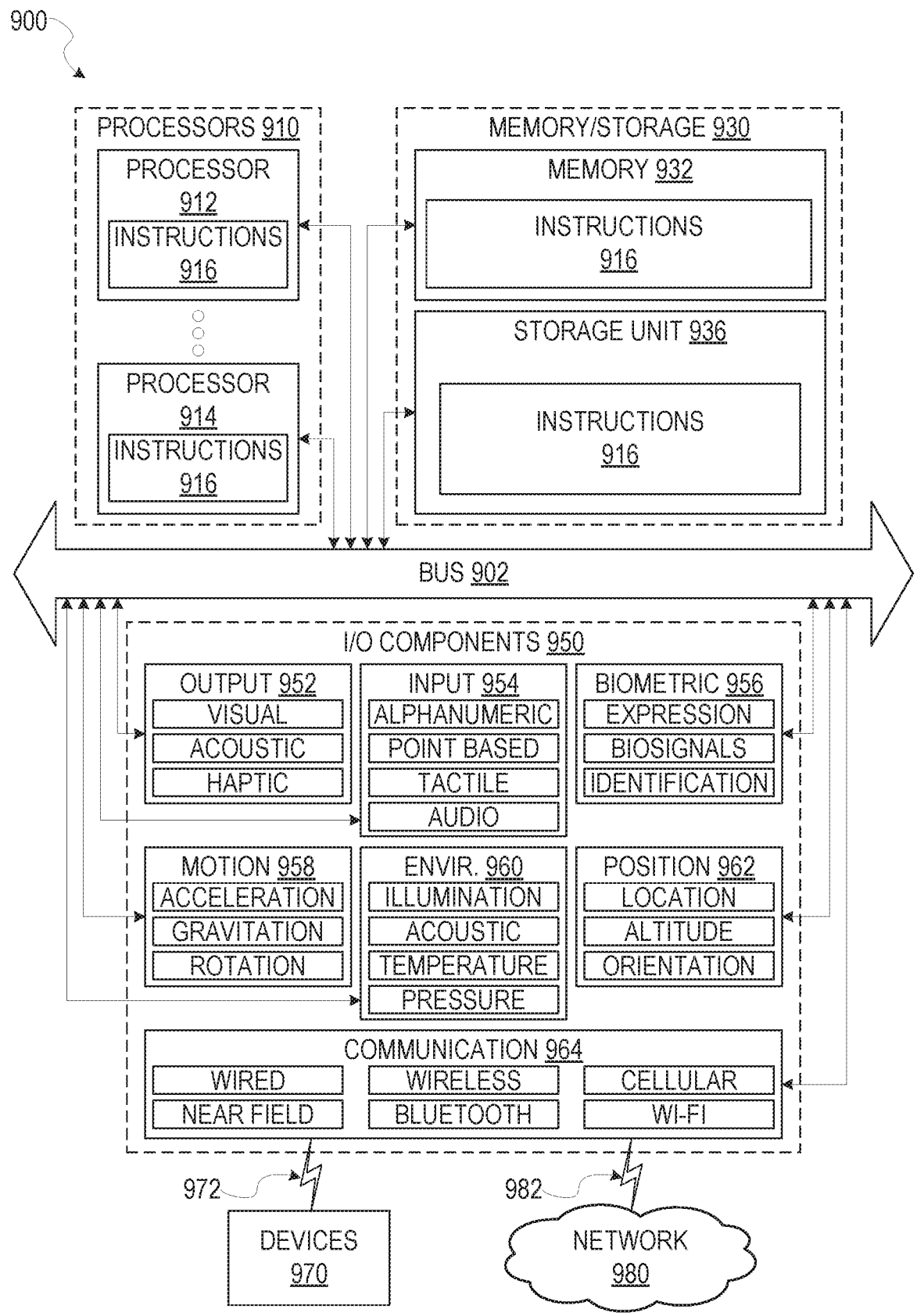
FIG. 9 is a block diagram illustrating components of a machine, according to some example embodiments, able to read instructions from a machine-readable medium (e.g., a machine-readable storage medium) and perform any one or more of the methodologies discussed herein

FIG. 9 is a block diagram illustrating components of a machine, according to some example embodiments, able to read instructions from a machine-readable medium (e.g., a machine-readable storage medium) and perform any one or more of the methodologies discussed herein Specifically, FIG. 9 shows a diagrammatic representation of a machine 900 in the example form of a computer system, within which instructions 916 (e.g., software, a program, an application, an apples, an app, or other executable code) for causing the machine 900 to perform any one or more of the methodologies discussed herein may be executed. For example the instructions 916 may cause the machine 900 to execute the flow diagrams of FIGS. 4-6. Additionally, or alternatively, the instructions 916 may implement one or more of the components of FIG. 2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WEAN), a wide area network (WAN), a wireless WAN (WWAN), a metropolitan area network (MAN), the Internet, a portion of the Internet, a portion of the Public Switched Telephone Network PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a machine-readable medium having instructions stored thereon, which, when executed by a processor, causes the processor to perform operations comprising:
receiving a plurality of names;
generating a plurality of phonetic cluster identifiers according to a phonetic spelling of the names using a database of phonetic associations and not including vowel sounds;
forming a plurality of name clusters by grouping the names having an equivalent cluster id into a corresponding name cluster of the plurality of name clusters;
removing names from respective name clusters that differ from a root name by more than either particular spelling of a phonetic sound or a specific member's reformulation according to a reformulation dictionary; and
suggesting, in response to receiving a name from a member of an online social networking system, one or more names by generating a phonetic cluster id for the received name and returning names found in the name cluster that matches the phonetic cluster id.

2. The system of claim 1, wherein the operations further comprise generating the reformulation dictionary and the database of phonetic associations using name spelling reformulations from members of the online social networking service.

3. The system of claim 2, wherein the operations further comprise removing an entry in the database of phonetic associations in response to the entry being determined from reformulations above a first threshold percentage or below a second threshold percentage.

4. The system of claim 1, wherein the name clusters are partitioned according to a source language for the names in the name clusters.

5. The system of claim 1, wherein the name includes multiple terms, the first term matching the name cluster according to the phonetic cluster id and additional terms being stored in additional nodes linked to the first term.

6. The system of claim 1, wherein the operations further comprise removing a first name from a name cluster based on the first name being less than or equal to a threshold number of characters long and a character difference between the first name and a root name for the respective name cluster being more than or equal to a threshold percentage of the threshold number of characters.

7. The system of claim 1, wherein the name clusters are structured to include a root name with other names in the respective name clusters linking in a tree structure from the root name.

8. A method comprising:
receiving a plurality of names;
generating a plurality of phonetic cluster identifiers according to a phonetic spelling of the names using a database of phonetic associations and not including vowel sounds;
forming a plurality of name clusters by grouping the names having an equivalent cluster id;
removing names from the respective name clusters that differ from a root name by more than either particular spelling of a phonetic sound or a specific member's reformulation according to a reformulation dictionary; and suggesting, in response to receiving a name from a member of an online social networking system, one or more names by generating a phonetic cluster id for the received name using the database of phonetic associations and returning names found in the name cluster that match the phonetic cluster id.

9. The method of claim 8, further comprising generating the reformulation dictionary and a database of phonetic associations using name spelling reformulations from members interactions with an online social networking service.

10. The method of claim 9, further comprising removing an entry in the database of phonetic associations in response to the entry being generated from reformulations above a first threshold percentage or being below a second threshold percentage.

11. The method of claim 8, wherein the name clusters are partitioned according to a source language for the names in the name clusters.

12. The method of claim 8, wherein the name includes multiple terms, the first term matching the name cluster according to the phonetic cluster id and additional terms being stored in additional nodes linked to the first term.

13. The method of claim 8, further comprising removing a first name from a name cluster based on the first name being less than or equal to a threshold number of characters long and a character difference between the first name and a root name for the respective name cluster being more than or equal to a threshold percentage of the threshold number of characters.

14. The method of claim 8, wherein the name clusters are structured to include a root name with other names in the respective name clusters linking in a tree structure from the root name.

15. A non-transitory machine-readable medium having instructions stored thereon, which, when executed by a processor, cause the processor to perform:
receiving a plurality of names;
generating a plurality of phonetic cluster identifiers according to a phonetic spelling of the names using a database of phonetic associations and not including vowel sounds;
forming a plurality of name clusters by grouping the names having an equivalent cluster id;
removing names from the respective name clusters that differ from a root name by more than either particular spelling of a phonetic sound or a specific member's reformulation according to a reformulation dictionary; and
suggesting, in response to receiving a name from a member of an online social networking system, one or more names by generating a phonetic cluster id for the received name using the database of phonetic associations and returning names found in the name cluster that matches the phonetic cluster id.

16. The machine-readable hardware medium of claim 15, wherein the instructions further cause the processor to perform generating the reformulation dictionary and a database of phonetic associations using name spelling reformulations from members' interactions with an online social networking service.

17. The machine-readable hardware medium of claim 16, wherein the instructions further cause the processor to perform removing an entry in the database of phonetic associations in response to the entry having reformulations above an upper threshold percentage or being below a lower threshold percentage.

18. The machine-readable hardware medium of claim 15, wherein the name includes multiple terms, the first term matching the name cluster according to the phonetic cluster id and additional terms being stored in additional nodes linked to the first term.

19. The machine-readable hardware medium of claim 15, wherein the indicating to keep one or more names in each name cluster is further based on the name being more than a threshold number of characters long and a character difference between the name and a root name for the respective name cluster being less than a threshold percentage of the threshold number of characters.

20. The machine-readable hardware medium of claim 15, wherein the name clusters are partitioned according to a source language for the names in the name clusters.

* * * * *